United States Patent
Claxton

[15] 3,668,380
[45] June 6, 1972

[54] COMPOSITE CURVE ANALYZER

[72] Inventor: William E. Claxton, Mogadore, Ohio
[73] Assignee: The Firestone Tire & Rubber Company, Akron, Ohio
[22] Filed: Oct. 14, 1969
[21] Appl. No.: 866,263

[52] U.S. Cl..................235/197, 035/019, 235/151.35, 235/183, 324/77 A
[51] Int. Cl. ............................................G06g 7/28
[58] Field of Search............235/183, 184, 197, 198, 151.35; 324/77 A; 35/19

[56] References Cited

UNITED STATES PATENTS

| | | | |
|---|---|---|---|
| 2,640,105 | 5/1963 | Bennett | 235/198 |
| 3,358,130 | 12/1967 | Miura et al. | 235/197 |
| 3,457,505 | 7/1969 | Crosby | 324/77 A X |
| 3,500,028 | 3/1970 | Killian | 235/183 |
| 3,527,926 | 9/1970 | Holy | 235/151.35 |
| 3,106,639 | 10/1963 | Nathan | 235/197 |
| 3,364,366 | 1/1968 | Dryden-Wolfson | 235/197 X |
| 3,560,726 | 2/1971 | Platt et al. | 235/197 |

FOREIGN PATENTS OR APPLICATIONS 1,002,476   8/1965   Great Britain......................324/77 A

OTHER PUBLICATIONS

I. Malmberg et al: Curve Resolver for Mixtures of Damped Time Waves. Part of the Report 3/1964 to 10/1967 on Experimental Investigation of the Fundamental Modes of a Collisionless Plasma. NASA Report N68- 22847 Nov. 1967. Appendix VIII is of Interest. Pages 113, 115- 123 Supplied.
Korn & Korn Textbook: Pages 290- 299. Chapter on Diode Function Generators, 1956.

*Primary Examiner*—Felix D. Gruber
*Attorney*—S. M. Clark and Willard L. G. Pollard

[57] ABSTRACT

A special purpose analog computer is provided to resolve and display a plurality of peaks from a composite curve. The peaks may selectively be either Gaussian or Lorentzian in form. Peak position, width and amplitude are independently controlled. Baseline slope and skewing can also be provided, as necessary, to fit the composite curve. The output of the device can be displayed on an oscilloscope and can be sent to an area readout system so that percent areas of each component curve can be ascertained. Further, if desired, the integral curve of any component or combination of components can be easily displayed.

16 Claims, 9 Drawing Figures

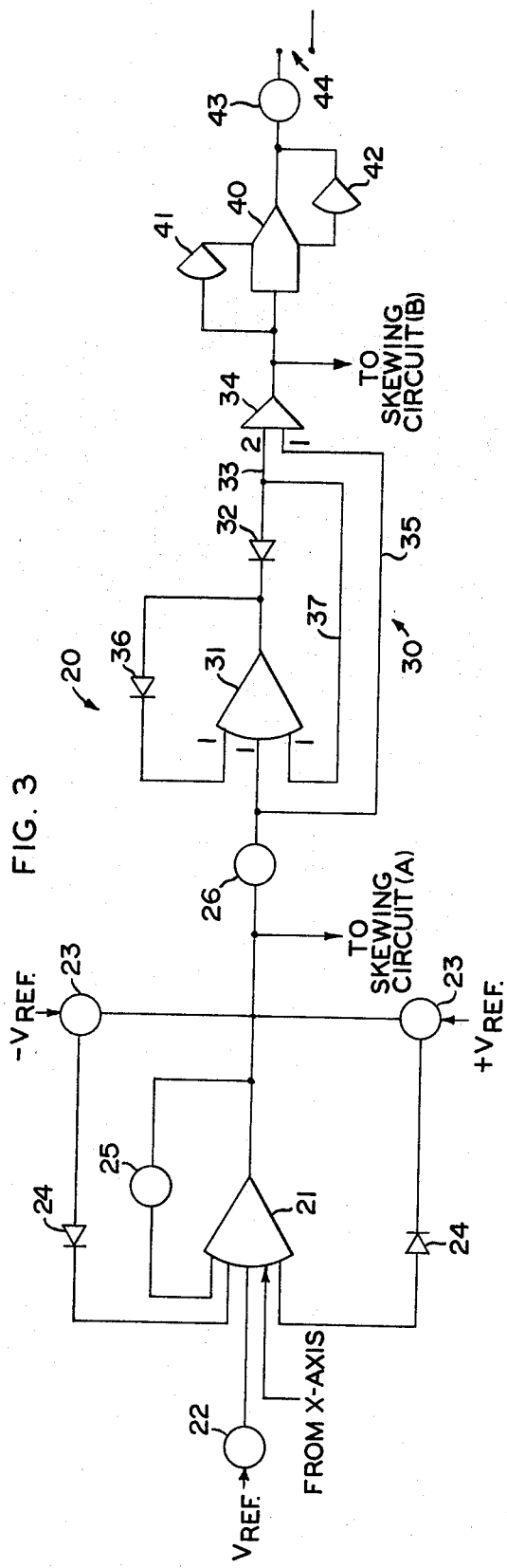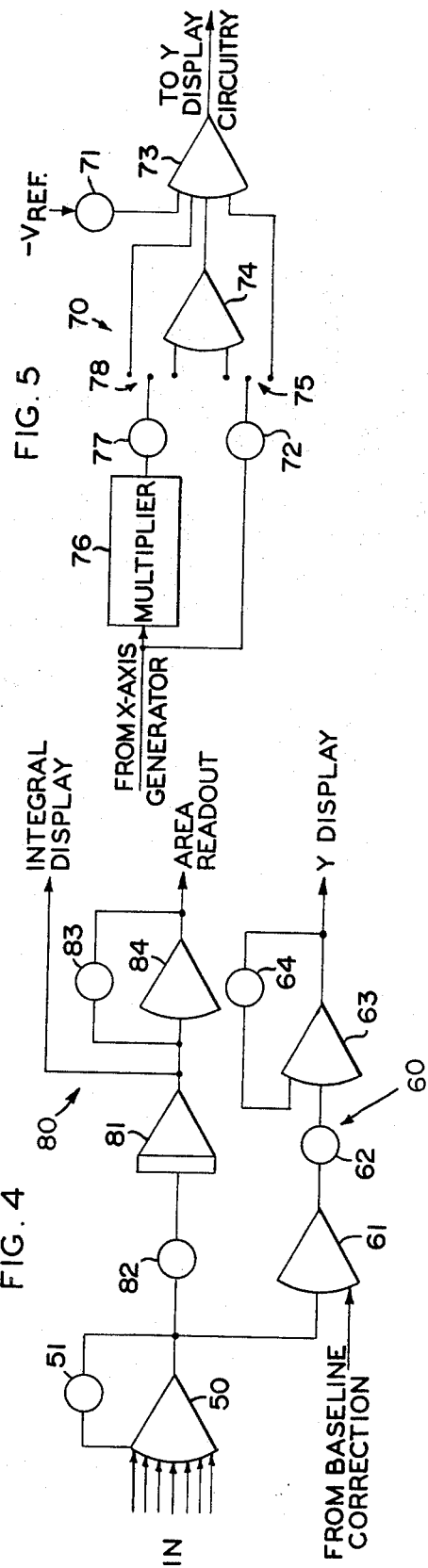

COMPOSITE CURVE ANALYZER

BACKGROUND OF THE INVENTION

This invention relates to a special purpose analog computer which is capable of resolving and displaying multiple peaks from a composite curve. The relative percent areas from each peak can be readily and accurately determined.

Many analytical techniques, such as spectroscopy, chromatography and X-ray diffraction, produce composite curves which are the sums of variable distribution functions having peaks which overlap. The separation of such composite curves into their various components is a problem frequently encountered in many industries. For example, in the rubber industry, resolution of spectra from infrared or nuclear magnetic resonance spectrometers can reveal important details of copolymer structure and composition.

Such resolution can be accomplished, for example, by tedious hand calculations. However, such calculations are not only time consuming, but also lacking in accuracy. On the other hand, digital computers have been programmed to perform the calculations. While this method gives better accuracy and quicker results than hand calculations, digital computers are not always available when needed. Further, the expense of utilizing valuable digital computer time is not warranted for such a project.

Special purpose analog computers have been devised to resolve composite curves into their individual component peaks. One such device generates a series of Gaussian curves along an X-axis, the position of each being controlled by a series of delay amplifiers independently operated. It has been found that this procedure is not only expensive to construct, having many unnecessary hardware components, but it also fails to provide direct coordination of the positioning of the various Gaussian curves. Further, this mechanism has been found somewhat inaccurate in that first, the circuits controlling the curve parameters of amplitude, width and position will tend to interact, and second, all composite curves cannot be accurately matched by Gaussian distribution components.

To this end, some have attempted to provide devices which generate curves of both Gaussian and Lorentzian distributions. However, such devices have not attained a high degree of accuracy probably due to the method employed for generating the various curves.

SUMMARY OF THE INVENTION

It is thus a primary object of the present invention to provide a special purpose analog computer which is capable of resolving a composite curve into its individual component peaks consisting of either Gaussian or Lorentzian distributions.

It is another object of the present invention to provide a device, as above, in which the individual component peak parameters of amplitude, position and width are independently controlled.

It is still another object of the present invention to provide a device, as above, which is capable of fast, accurate, and economic operation.

It is yet another object of the present invention to provide a device, as above, which will both display the component curves and give an area percent readout for each such curve.

It is a further object of the present invention to provide a device, as above, which will resolve skewed curves and curves having sloped or curbed baselines.

These and other objects which will become apparent from the following specification are accomplished by means hereinafter described and claimed.

In general, a special purpose analog computer is formed of a plurality of channels which are supplied with a common X-axis input signal from a time base integrator. Each channel is capable of producing either a Gaussian or Lorentzian distribution waveform from a variable diode function generator located therein.

The position of an individual peak is obtained by offsetting the common X-axis signal with a variable potentiometer voltage. Distribution width is controlled by a feedback potentiometer at the offset amplifier while amplitude is controlled by a potentiometer in series with the output of the variable diode function generator. The output of each channel is fed to a summing amplifier whose output is displayed and also transmitted to an integrator for area readout. Skewed distributions can be matched by using baseline skewing circuits.

The preferred embodiment of the present invention is shown by way of example in the accompanying drawings and hereinafter described in detail without attempting to show all of the various forms and modifications in which the invention might be embodied; the invention being defined in the appended claims and not the details of the specification.

BRIEF DESCRIPTION OF THE DRAWINGS

FIG. 3 is a schematic diagram of a function generating channel according to the concept of the present invention, seven of which are shown in block form in FIG. 1.

FIG. 4 is a schematic diagram of the all-channel summing amplifier, the area integrator and readout circuitry, and the summing circuit shown in block form in FIG. 1.

FIG. 5 is a schematic diagram of the baseline correction circuitry shown in block form in FIG. 1.

DESCRIPTION OF THE PREFERRED EMBODIMENT

It has been found that most, if not all, composite curves obtained in practice are made up of components of Gaussian or Lorentzian distribution. The general equation describing a Lorentz distribution in un-normalized form is $$Y = \frac{Ab^2}{(X - \bar{X})^2 + b^2}$$

where $\bar{X}$=the X-axis coordinate of the peak position; $A$=the maximum amplitude at $X=\bar{X}$; and $b$ is a measure of half width. By defining $(X-\bar{X})$ as $\Delta X$ and dividing the numerator and denominator by $b^2$, the above equation takes on the form of $$\frac{A}{\left(\frac{\Delta X}{b}\right)^2 + 1}.$$

The equation describing the envelope of a normalized Gaussian distribution is $$Y = \frac{1}{\sqrt{2\pi}\sigma} e^{-(\Delta X/b)^2}$$

wherein $\sigma$=the standard deviation and also $b/\sqrt{2}$. In practice, composite distributions are not normalized and therefore, like the Lorentzian equation described above, the un-normalized form is important to consider. In this case $$Y = Ae^{-(\Delta X/b)^2}$$

with $A$, $b$ and $\Delta X$ being defined in the same way as in the Lorentzian equation. It can thus be seen that the term $(\Delta X/b)^2$ is common to both distributions. This fact is used advantageously in a manner to hereinafter become evident.

Figure 1:
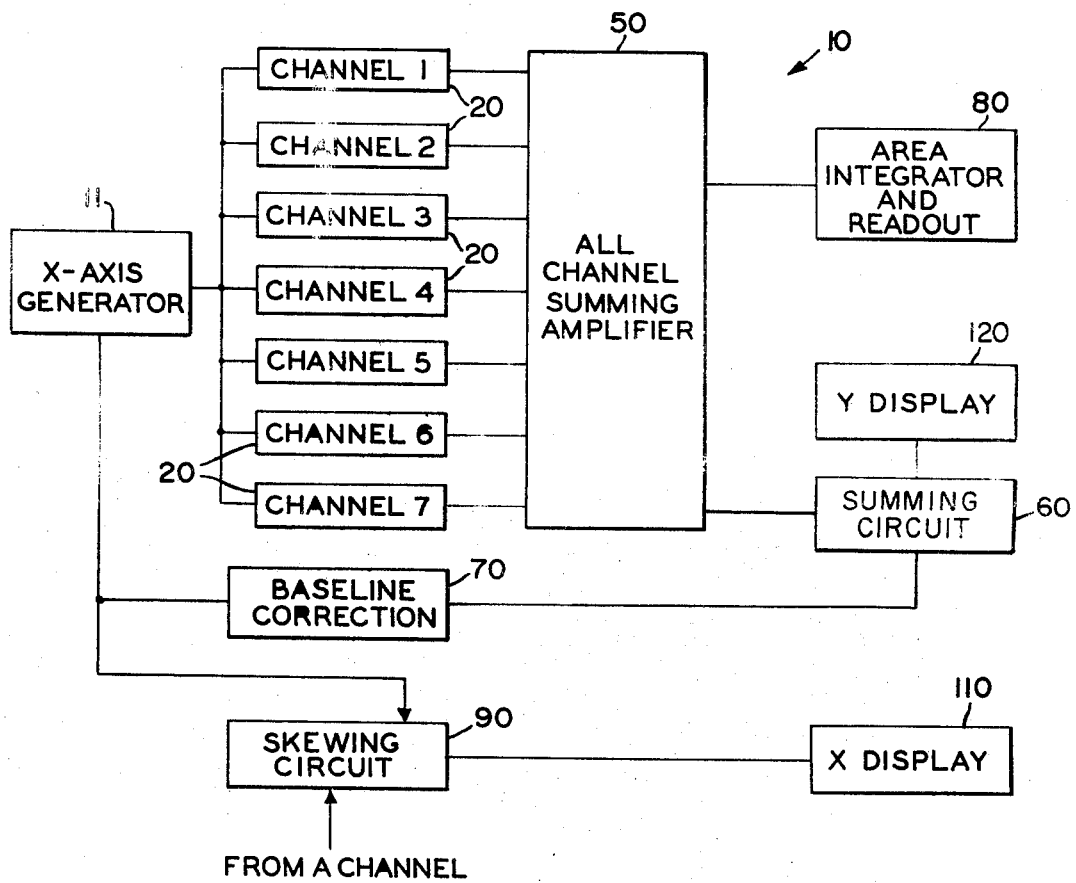
FIG. 1 is a block schematic diagram of the composite curve analyzer according to the concept of the present invention.
Figure 2:
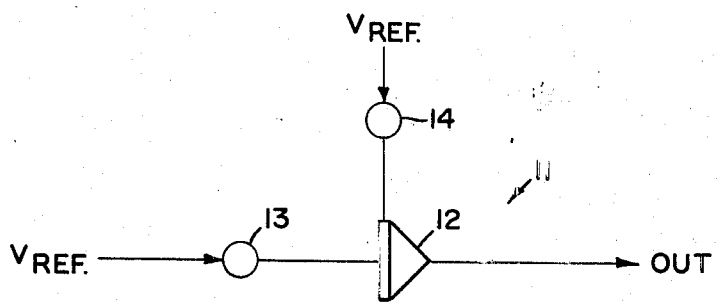
FIG. 2 is a schematic diagram of the X-axis generator shown in block form in FIG. 1.

A composite curve analyzer constructed according to the concept of the present invention is indicated generally by the numeral 10 in FIG. 1. The independent variable $X$ is generated by a X-axis generator 11 shown in more detail in FIG. 2 as comprising an integrator 12, a time scale potentiometer 13, and an initial condition potentiometer 14. As is well-known in the art, an integrator is a device whose output represents the time integral of the input. If, for example, a constant voltage is put into the integrator circuit, a ramp voltage is generated thereby. In the circuitry shown in FIG. 2, a suitable reference voltage is supplied through each potentiometer, the rate of sweep of the X-axis being controlled by the time scale potentiometer 13, while the setting of the initial condition potentiometer 14 determines the point at which the X-axis sweep is begun. Assuming, for example, that the output of the integrator 12 has been held at −10 volts, (by providing a supply voltage to the initial condition potentiometer 14 of +10 volts with the potentiometer 14 set at unity) the integrator 12 will provide a ramp output ranging from −10 to +10 volts with the reference voltage to potentiometer 13 negative, the slope of the ramp being determined by the setting of potentiometer 13. By utilizing a standard resetting device such as a relay comparator (not shown), the X-axis generator 11 can then automatically and repetitively sweep the entire range of the X-axis. Since the generator 11 is connected to the X-axis display of a plotter or scope, as will hereinafter be explained in more detail, the gain controls therein can be set so that a −10 volt output corresponds to a zero X coordinate, giving a 20 volt sweeping range. If manual operation were desired, the initial condition potentiometer 14 could be rotated from unity to zero to sweep half the X-axis range. Then a mere reversal of the polarity of its reference voltage and rotation back to unity would sweep the remainder of the X-axis range.

The output of the generator 11 is fed to each of a plurality of function generating channels 20. While seven channels are shown, it is evident that any number of channels could be utilized, as desired. Each channel 20 can be made up of identical components so that a description of one such channel as shown in FIG. 3 will provide an understanding of the operation of any desired number of channels. The number of channels needed, of course, would depend on the number of component peaks in a composite curve. For most curves, it has been found that seven channels are adequate, very often only three or four being utilized.

The position of the peak of the distribution function generated by each channel can be independently adjusted by applying the output of the X-axis generator (the independent variable $X$) and a variable offset voltage (corresponding to $\bar{X}$, the peak position) to a high gain summing amplifier 21. The output from amplifier 21 is thus $(X - \bar{X})$ or $\Delta X$, the $X$ variable having been summed with a voltage of chosen polarity to match the peak position of the composite curve. As will hereinafter be evident, the value of $Y$ for this particular channel will be a maximum whenever, $X$ equals O, $X$ equaling $\bar{X}$. The value of $\bar{X}$ is determined by a position potentiometer 22 being supplied with a reference voltage. A feedback limiting circuit comprising potentiometers 23 and diodes 24 prevent overloads resulting from large offset voltages. In the example used above, these limiters would not allow the voltage to exceed plus or minus 10 volts.

The use of a high gain amplifier 21 to provide the $\Delta X$ parameter permits the use of a feedback width decrease potentiometer 25 to help control the value of the width parameter $b$. The value of $b$ is determined as the ratio of the potentiometer 25 setting to the setting of an attenuating or width increasing potentiometer 26 following the amplifier 21. In the example described above using 10 volt reference voltages, if the feedback potentiometer 25 is set at unity, $b$ can be varied from 1.0 to 10.0 by changing the attenuator potentiometer 26 from 1.0 down to 0.1. If, on the other hand, potentiometer 26 is set at unity, $b$ will equal the setting of potentiometer 25 and can be varied from near 0 to 1.0. It follows from the above description that changing the width of particular curve in one channel does not change the form, peak value or peak position of the distribution. It is an independent adjustment and the value of $\Delta X/b$ is provided at the output of the potentiometer 26.

The voltage corresponding to the value of $\Delta X/b$ is next fed to an absolute value circuit indicated generally by the numeral 30 in FIG. 3. As is well-known in the art, such circuitry provides an output which is the absolute value of the input; that is, a positive voltage output is always provided. As briefly shown in FIG. 3, if $\Delta X/b$ is positive, it is made negative by the summing inverter amplifier 31 and since it has been made negative can pass through diode 32 through line 33 into a summing inverter amplifier 34 having a gain factor of two in line 33. The positive voltage also passes through line 35 to amplifier 34 having a gain factor of 1. Therefore the absolute value of $\Delta X/b$ is generated therefrom. If $\Delta X/b$ is negative, the diode 32 will block it since it was made positive by amplifier 31. Therefore the only way the negative voltage can pass is through line 35 and it is inverted in amplifier 34 to again provide the absolute value of $\Delta X/b$. A feedback diode 36 provides positive feedback to amplifier 31 while line 37 provides a negative feedback. As will hereinafter become more evident, providing a signal having an absolute value as opposed to providing both positive and negative voltages eliminates the need of extra hardware components.

The output of the absolute value circuit 30, $|\Delta X/b|$ is fed to a variable diode function generator (VDFG) 40. Each VDFG is set up to accept the voltage $|\Delta X/b|$ and generate therefrom either the Gaussian or Lorentzian function. The details of the programming of each VDFG as desired are well-known to one having ordinary skill in the art particularly with reference to manuals published by the manufacturers. As shown in FIG. 3, the VDFG is utilized in conjunction with two amplifiers 41 and 42 present due to loading considerations within the network of resistors and diodes comprising the the VDFG. The output of the VDFG 40 comprises a series of short line segments having varying slopes which, when totalled along the X-axis, simulate vary closely the Gaussian or Lorentzian equations.

The output of the VDFG 40 is fed to an amplitude potentiometer 43 which is utilized to vary the height or amplitude of the Gaussian or Lorentzian distribution. As such, it is evident that the function amplitude can be varied independently of the width and position.

Each channel 20 can be provided with either a Gaussian or Lorentzian generating VDFG, as desired, and when analyzing a composite curve, only those channels having appropriate components can be connected, via switch 44 to a channel summing amplifier indicated generally by the numeral 50 in FIG. 1 and shown in more detail in FIG. 4.

Amplifier 50 forms the composite of the output from each channel, feedback potentiometer 51 being utilized to govern the gain of the whole network 10 and therefore the amplitude of all the peaks simultaneously. The output of amplifier 50 is connected to the Y display circuit 120 of an oscilloscope after being summed with the output of a baseline correction circuit 70 in a summing circuit 60 to be hereinafter discussed) and is provided to an area integrator and readout circuit indicated by the numeral 80 in FIG. 1 and shown in FIG. 4 as comprising an integrator 81 which computes the area under the curve being displayed on the X and Y display axes, and reads out that area on an instrument such as a digital voltmeter (not shown).

An area gain potentiometer 82 at the input of integrator 81 permits appropriate scaling of the output of the amplifier 50 to avoid overloading integrator 81. A 100% potentiometer 83 in conjunction with an amplifier 84 can be used to calibrate the digital voltmeter so that when viewing the composite curve, the voltmeter reads 1,000 (100%). Then the relative areas of each component can be computed by switching in only the appropriate channel and integrating. Further, as shown in FIG. 4, the integral curve can be readily displayed, if desired.

Figure 7:
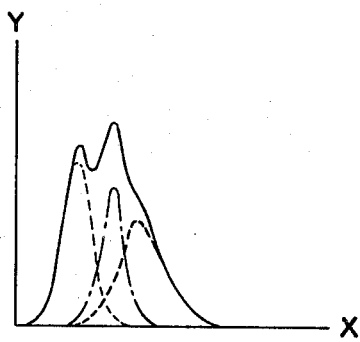
FIG. 7 is an exemplary plot of a composite curve, shown in solid lines, having two Gaussian components shown in dotted lines and one Lorentzian component shown in chain lines.
Figure 8:
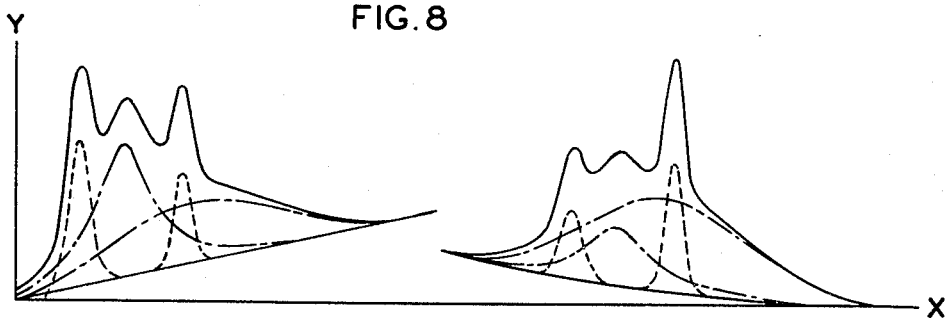
FIG. 8 depicts exemplary plots of baseline corrected composite curves shown in solid lines, having two Gaussian components shown in dotted lines, two Lorentzian components shown in chain lines, the curve at the left having a slanted linear baseline, and the curve at the right, a curved baseline.

The apparatus described thus far is capable of matching curves having components of simple Gaussian and Lorentzian distribution. An example of such a basic curve is shown in FIG. 7 wherein each component is symmetrical about its peak. If, of course, the curve to be matched contains nonsymmetrical distributions, curve skewing (shown in FIG. 9) will be necessary, as hereinafter discussed. Further, it has been found that many experimentally obtained composite curves do not show a zero baseline. Rather, a sloped or even curved baseline may form the basis of such a curve. Examples of such functions are shown in FIG. 8. Correction to the Y value is provided by a baseline correction circuit 70 shown in detail in FIG. 5. Circuit 70 generates a signal corresponding to the function $a_0 + a_1 x + a_2 x^2$ ($a_0$, $a_1$, $a_2$ being constants) which signal can be added to the output of amplifier 50. The constant $a_0$ controls the level of the baseline and is varied by adjusting the $a_0$ potentiometer 71 setting. Use of a negative reference voltage will shift the baseline up and a positive reference shifts it down. A linear slope is introduced through the $a_1$ potentiometer 72 setting. A positive slope results when the $a_1 x$ term is connected directly to the input of the baseline correction amplifier 73 or can be negative when connected to amplifier 73 through inverter 74, as determined by the position of switch 75. Curvature in the baseline can be introduced by using a multiplier 76 having an X input from generator 11 and forming the $x^2$ term. The $a_2$ constant is determined by the setting of $a_2$ potentiometer 77. The position of a switch 78 determines whether the input to amplifier 73 is positive or negative, that is, whether the curvature is positive or negative.

As shown in FIG. 4, the output of the baseline correction circuit 70 is connected to the Y display 120 through a summing circuit indicated generally by the numeral 60 in FIG. 1 and shown in detail in FIG. 4 as consisting of a summing and inverting amplifier 61 which adds any baseline correction described above to the output of the all channel summing amplifier 50. An attenuating potentiometer 62 is utilized to decrease the voltage, if necessary, which voltage is fed to an inverter 63 to re-establish the correct voltage polarity. A feedback potentiometer 64 is provided to provide an increase to the voltage out of inverter 63, as desired. Such a connection allows the baseline to be corrected without interfering with or affecting the area readout circuitry.

Having now described the manner in which the Y-axis plot is varied through selective channels 20 and/or baseline correction circuitry 70, correction or skewing for display of the X-axis variable will be described. As previously described, the general Gaussian and Lorentzian distributions are symmetrical about their peaks. Therefore problems could arise if the composite curve consisted of nonsymmetrical distributions. A baseline skewing circuit 90 is provided to allow the operator to make a quick match of an obviously nonsymmetrical distribution. In this manner, the Y value is unaffected and area readout is the same with or without skewing.

If no skewing is desired, the signal from the X-axis generator is provided through potentiometer 91 to summing amplifier 92 and directly to the X-axis display 110 of the oscilloscope. If, however, the distribution signal from a particular channel is to be skewed, the amplifier 92 adds it to a signal from the skewing circuitry derived as follows: A switch 93 is provided so that when in position "A" the $\Delta X$ value is fed from the particular channel to the skewing circuit 90. As shown in FIG. 3, this $\Delta X$ value results as the output of amplifier 21. When switch 93 is in position "B", the $|\Delta X/b|$ value is the input to skewing circuit 90. This value comes from the output of amplifier 34, as shown in FIG. 3. Whatever the position of switch 93, an inverting amplifier 94 inverts the voltage and provides it to a switch 95. If in position "A", switch 95 allows the passage of the inverted voltage from amplifier 94. However, if in position "B", a voltage corresponding to the input to amplifier 94 is provided due to the inverter 96.

Depending, therefore, on the position of switches 93 and 95, either a positive or a negative value of $\Delta X$ or $|\Delta X/b|$ can be supplied via line 97 to a control portion 100 of skewing circuit 90. Due to the presence of diode 101, only positive values can pass through line 102, switch 103 and onto summing amplifier 92. Conversely, due to diode 104 in line 105, only negative voltages can pass through switch 106 to amplifier 92. Skewness control potentiometers 107 and 108, in lines 102 and 105, respectively, regulate the amount of voltage to amplifier 92 and are therefore utilized to fit the skewed Gaussian or Lorentzian function to the composite curve.

Figure 6:
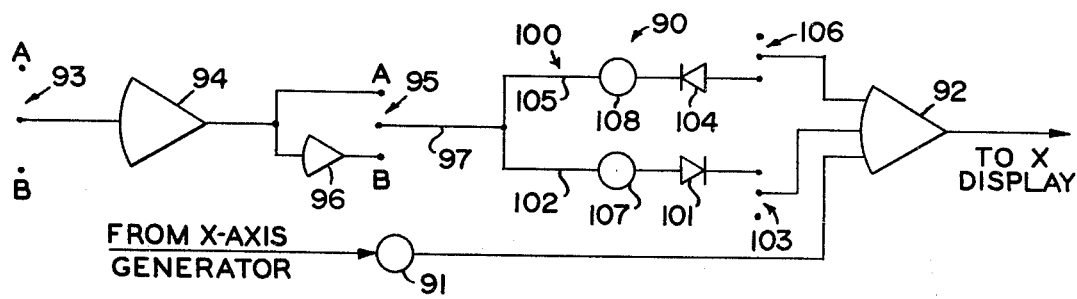
FIG. 6 is a schematic diagram of the baseline skewing circuitry shown in block form in FIG. 1.
Figure 9:
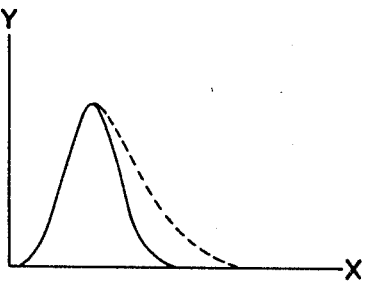
FIG. 9 is an exemplary plot of a component Gaussian curve shown in its standard form in solid lines and shown with a skew factor in dotted lines.

From the above description, it should be evident that the skewing circuit 90 enables one, through various combinations of the switches 93, 95, 103 and 106, to match a wide variety of skewed component curves such as that shown in FIG. 9, which shows, in the dotted lines, the standard Gaussian curve being skewed to the right. This skewed curve could be obtained out of the circuitry of FIG. 6 as follows: With switch 93 in position "A" the $\Delta X$ term is fed to the inverting amplifier 94. With switch 95 in position "A", the inverted value of $\Delta X$ passes to the control circuit 100. Here, with switch 103 open and switch 106 closed, the inverted value of $\Delta X$ will not pass through line 102 and cannot pass through line 105 until it becomes negative. The valve of $\Delta X$ is positive on the right hand side of a distribution and therefore the inverted value of $\Delta X$ will not pass through diode 104 and onto amplifier until the peak of the curve is reached (as shown by the right hand skewing in FIG. 9). Other types of skewing can be readily obtained in a similar manner.

A composite curve analyzer constructed according to the concept of the present invention as described above, enables one to accurately match any experimental curve by providing Gaussian and Lorentzian distributions with straight, curved, or slanted baselines and skewness factors, and otherwise accomplishes the objects of the invention.

I claim:

1. A composite curve analyzer comprising, input reference voltage means providing an output signal, means receiving the output signal of said input reference voltage means and generating a signal corresponding to an independent variable, a plurality of channel means each receiving the signal corresponding to an independent variable and generating output signals corresponding to component curves of Gaussian and Lorentzian distribution selectively therefrom, means within said channel means for independently selectively regulating the horizontal position, the width, and the amplitude of selected of said output signals corresponding to component curves of Gaussian and Lorentzian distribution, means for summing selected output signals of said channel means to form a signal corresponding to a composite curve, and means for selectively displaying each said component curve and said composite curve.

2. A composite curve analyzer as in claim 1, further including baseline correction means providing an output signal which is selectively added to said signal corresponding to a composite curve.

3. A composite curve analyzer as in claim 2, wherein said baseline correction means includes means for adjusting the level of the reference baseline of said composite curve.

4. A composite curve analyzer as in claim 2, wherein said baseline correction means includes means for regulating the slope of the reference baseline of said composite curve.

5. A composite curve analyzer as in claim 2, wherein said baseline correction means includes means for regulating the curvature of the reference baseline of said composite curve.

6. A composite curve analyzer as in claim 1, each said channel means including a variable diode function generator selectively generating said output signals corresponding to said component curves of Gaussian and Lorentzian distribution.

7. A composite curve analyzer as in claim 1, further including means for regulating the amplitude of said composite curve.

8. A composite curve analyzer comprising, input reference voltage means providing an output signal, means receiving the output signal of said input reference voltage means and generating a signal corresponding to an independent variable, a plurality of channel means each receiving said signal corresponding to an independent variable and generating output signals corresponding to component curves of Gaussian and Lorentzian distribution selectively therefrom, means for selectively skewing any of said component curves, means for summing selected output signals of said channel means to form a signal corresponding to a composite curve, and means for selectively displaying each said component curve and said composite curve.

9. A composite curve analyzer as in claim 8, wherein said means for selectively skewing any of said component curves includes a skewing circuit having a control portion, said control portion receiving a signal from a plurality of switch means.

10. A composite curve analyzer as in claim 9, wherein a summing means adds the output of said skewing circuit to said signal corresponding to an independent variable.

11. A composite curve analyzer comprising, input reference voltage means providing an output signal, means receiving the output signal of said input reference voltage means and generating a signal corresponding to an independent variable, a plurality of channel means each receiving said signal corresponding to an independent variable and generating output signals corresponding to component curves of Gaussian and Lorentzian distribution selectively therefrom, means for summing selected output signals of said channel means to form a signal corresponding to a composite curve, means for selectively displaying each said component curve and said composite curve, and means for calculating and selectively reading out the area of said component curve and said composite curve.

12. A composite curve analyzer as in claim 11, wherein said means for calculating the area of each said component of said composite curve includes integrator means.

13. A composite curve analyzer as in claim 12 further including means for displaying the output of said integrator means.

14. A composite curve analyzer comprising, input reference voltage means providing an output signal, integrator means providing an output voltage signal equal to the time integral of said output signal of said input reference voltage means, a plurality of channel means each receiving said output voltage signal of said integrator means and generating output signals corresponding to component curves of Gaussian and Lorentzian distribution selectively therefrom, means for summing selected output signals of said channel means to form a signal corresponding to a composite curve, and means for selectively displaying each said component curve and said composite curve.

15. A composite curve analyzer as in claim 14, further including means for controlling the starting point of said integrator means, and means for controlling the rate of operation of said integrator means.

16. Apparatus for selectively producing a signal corresponding to a curve of Gaussian and Lorentzian distribution from a signal corresponding to an independent variable $X$, each said curve having a common factor $(X-\overline{X})/b$ where $\overline{x}$ equals the position of the peak of the curve and $b$ equals the half width of the curve; said apparatus comprising; means receiving the signal corresponding to the independent variable $X$ and the selectively variable signal $\overline{X}$, and providing an output signal corresponding to $X-\overline{X}$; means operating on said signal corresponding to $X-\overline{X}$ and providing an output signal corresponding to $(X-\overline{X})/b$; and means operating on said signal corresponding to $(X-\overline{X})/b$ and providing an output signal selectively corresponding to a curve of Gaussian and Lorentzian distribution.

* * * * *

UNITED STATES PATENT OFFICE
CERTIFICATE OF CORRECTION

Patent No. 3,668,380   Dated June 6, 1972

Inventor(s) William E. Claxton

It is certified that error appears in the above-identified patent and that said Letters Patent are hereby corrected as shown below:

Col. 3, line 60 "X equals 0" should be -- $\Delta X$ equals 0 --

Col. 4, line 44 "vary" should be -- very --

Col. 4, line 61 insert parenthesis before "after"

Col. 4, line 74 "1,000" should be -- 1.000 --

Col. 5, line 20 "a" should be -- $a_o$ --

Col. 6, line 25 "valve" should be -- value --

Signed and sealed this 27th day of November 1973.

(SEAL)
Attest:

EDWARD M. FLETCHER, JR.
Attesting Officer

RENE D. TEGTMEYER
Acting Commissioner of Patents